United States Patent [19]

Abney

[11] Patent Number: 5,289,560
[45] Date of Patent: Feb. 22, 1994

[54] DC MOTOR CONTROL USING FREQUENCY AND PULSEWIDTH MODULATION

[76] Inventor: Harold W. Abney, 3301B Moss Ct., Midland, Tex. 79707

[21] Appl. No.: 971,534

[22] Filed: Nov. 3, 1992

[51] Int. Cl.$^5$ .................................................. H02P 5/17
[52] U.S. Cl. ..................................... 388/811; 388/814; 318/608
[58] Field of Search ................... 388/811, 814; 318/608

[56] References Cited

U.S. PATENT DOCUMENTS

| | | | |
|---|---|---|---|
| 3,836,756 | 9/1974 | Yammoto et al. | 318/608 |
| 3,971,972 | 7/1976 | Stich | 318/227 |
| 4,233,549 | 11/1980 | Dighe | 318/317 |
| 4,348,585 | 9/1982 | Hoffman | 318/318 |
| 4,386,302 | 5/1983 | Iwasawa | 318/318 |
| 4,544,868 | 10/1985 | Murty | 318/254 |
| 4,626,750 | 12/1986 | Post | 318/139 |
| 4,751,439 | 6/1988 | Buchwald et al. | 318/305 |
| 4,855,652 | 8/1989 | Yamashita et al. | 318/268 |
| 5,017,854 | 5/1991 | Gully et al. | 318/811 |
| 5,029,229 | 7/1991 | Nelson, III | 388/811 |
| 5,086,261 | 2/1992 | Sakata et al. | 388/811 |
| 5,087,865 | 2/1992 | Nelson, III | 318/139 |
| 5,089,761 | 2/1992 | Nakazawa | 318/811 |

Primary Examiner—William M. Shoop, Jr.
Assistant Examiner—Karen Masih
Attorney, Agent, or Firm—Richards, Medlock & Andrews

[57] ABSTRACT

The flow of power through a field effect transistor to a DC motor is controlled by the output of a frequency modulator having a low frequency pulsed signal applied to one input thereof and a high frequency pulsed signal applied to a second input thereof. The pulse width of each "on" pulse of the low frequency pulsed signal is varied in response to a signal representing a desired motor speed. Optionally, the pulse width of each "on" pulse of the high frequency pulsed signal can also be varied in response to the signal representing the desired motor speed. A filter circuit can be employed to prevent rapid changes in the pulse width of the low frequency pulsed signal. Similarly, a filter circuit can be used to avoid rapid changes in the pulse width of the high frequency pulsed signal. A freewheeling diode can be used to minimize inverse voltage spikes across the motor.

33 Claims, 2 Drawing Sheets 5,289,560

DC MOTOR CONTROL USING FREQUENCY AND PULSEWIDTH MODULATION

FIELD OF THE INVENTION

The invention relates to a control system for a direct current motor. In one aspect the invention relates to a system for controlling the speed of a direct current motor. In another aspect the invention relates to an energy conservation control system for supplying current from a battery to a DC motor only in the amount needed for the desired motor speed.

BACKGROUND OF THE INVENTION

Traditionally, the speed (revolutions per minute) and torque (horsepower) of a DC motor have been controlled by varying the magnitude of the voltage applied across the motor and/or the magnitude of the current passed through the motor. One technique employed a variable resistance connected in series with the DC power source and the windings of the DC motor. Another technique employed a variable shunt resistance connected across the motor terminals in parallel with the motor. A third technique employed a combination of series and parallel connected variable resistances. In each of these techniques, a substantial amount of the power provided by the DC power source is wasted due to the power loss in the variable resistance throughout the normal range of motor speed. The dissipation of power in the variable resistance also results in the production of heat in the control circuit, which can be detrimental.

A fourth technique avoided the use of the variable resistance elements by employing an interrupter or chopper to produce "on" pulses having a variable width in order to control the average current available to the motor by changing the pulsewidth of the "on" pulses. However, when a DC voltage is applied to or removed from a DC motor, the inductive components of the motor react to produce voltage and current excursions within the interconnected power system. This inductive reactance is opposite in polarity with the desired change in DC current and detracts from the motor performance. In order to minimize this effect, diodes have been placed across the motor terminals to absorb the inverse voltage spikes. As a result of the diode action, the motor can temporarily overspeed or "freewheel" instead of resisting changes in the RPM of the motor.

The inductive components of the DC motor are inherently sensitive to frequency. The pulsing rate (frequency) used in controlling a DC motor must be high enough to overcome the tendency of the motor to "buck" or "jump" on startup or when running under load at low RPM. However, if the motor RPM is above the stall range, the pulsing rate can be reduced significantly.

Some solid state motor control devices, e.g. the system of Nelson, U.S. Pat. No. 5,029,229, have utilized a voltage signal from a speed control lever as an input to a high frequency generator to vary the on-off ratio of fixed frequency pulses which are supplied to a power FET circuit to control the power flow to a DC motor. Some of these devices also employ freewheeling diodes to minimize the inverse voltage spikes which occur at the beginning and end of each pulse. These devices generally provide a DC power efficiency which is 10% to 20% better than that achieved with resistive controls. However, each on-off cycle of the high frequency pulses results in a power loss due to heat produced by the transition of the power FET devices from a high resistance value to a low resistance value.

Thus, there is still a need for a control circuit which can achieve a greater efficiency in the operation of a variable speed DC motor.

SUMMARY OF THE INVENTION

The present invention utilizes two independent frequency generators to produce a first signal having high frequency pulses (e.g., 20 kHz) and a second signal having pulses with a frequency which is substantially lower than the frequency of the high frequency pulses (e.g. 330 Hz). The two signals are applied to respective inputs of a frequency modulator to produce a frequency modulated output which is applied to a power circuit to thereby control the power applied to a DC motor. The on-off ratio of the high frequency pulses can be maintained constant while the control of the DC motor is effected through the varying of the on-off ratio of the low frequency pulses in response to a voltage signal from a control circuit which in turn responds to the position of a speed control lever representing the desired speed of said motor. Optionally, the on-off ratio of the high frequency pulses can also be varied along with the on-off ratio of the low frequency pulses.

Accordingly, it is an object of the present invention to improve the electrical efficiency of a DC motor. Another object of the invention is to provide a motor control system which supplies current from a battery to a DC motor only in the amount needed for the desired motor speed. Yet another object of the invention is to increase the effective horsepower of a DC motor.

DETAILED DESCRIPTION

Figure 1:
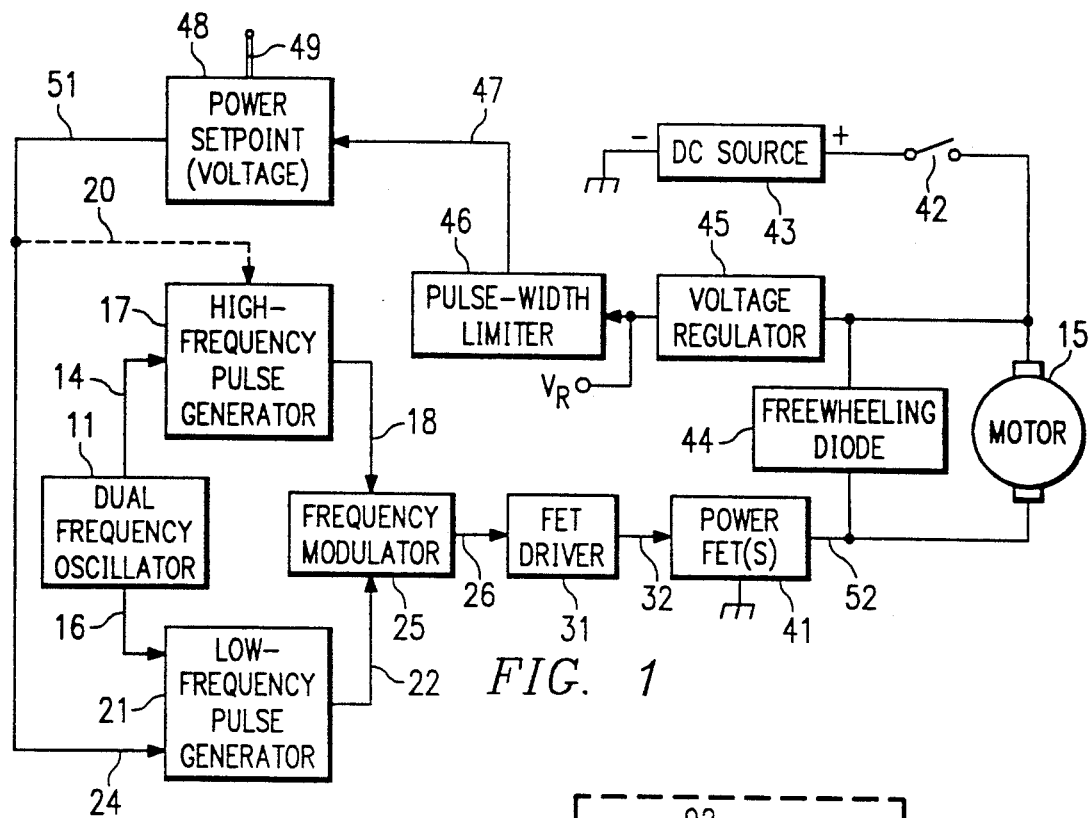
FIG. 1 is a block diagram of a DC motor having a speed control system in accordance with the present invention; p
Figure 2:
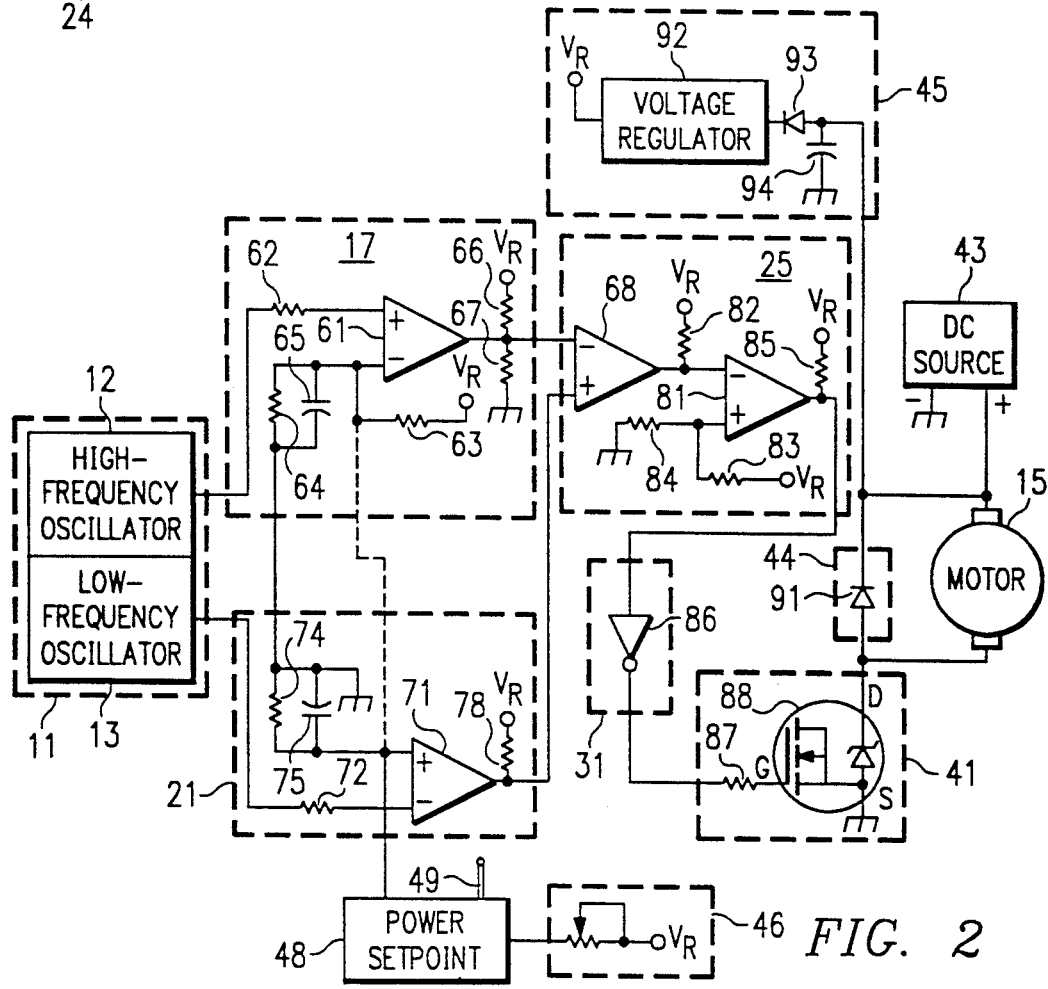
FIG. 2 is a schematic diagram of one embodiment of the system of FIG. 1.

Referring now to FIGS. 1 and 2, the dual frequency oscillator 11 is an integrated circuit configured to produce two independent frequencies and comprises a high-frequency oscillator 12 and a low-frequency oscillator 13. The output of each oscillator can be any suitable waveform, e.g. a sawtooth waveform, that has a suitable maximum amplitude, e.g. in the range of about 0.5 $V_R$ to about 1.0 $V_R$, preferably in the range of about 0.6 $V_R$ to about 0.7 $V_R$, where $V_R$ is the system regulated voltage, and a suitable minimum amplitude which is less than the maximum amplitude, e.g. in the range of about 0 to about 0.5 $V_R$ and preferably in the range of about 0.3 $V_R$ to about 0.4 $V_R$.

The frequency of the output signal 14 from the high frequency oscillator 12 should be above the audible range in order to avoid disturbing the operator, and should also be high enough to insure a smooth start if the motor 15 is stalled. While any suitable frequency can be employed, a frequency in the range of about 5 kHz to about 100 kHz is generally suitable, and a frequency in the range of about 15 kHz to about 25 kHz is presently preferred for the output signal 14 from the high frequency oscillator 12.

The frequency of the output signal 16 from the low frequency oscillator 13 can be selected to at least closely match the resonant characteristics of the DC motor 15, thereby increasing the RPM and torque of the motor 15. While any suitable frequency can be employed, a frequency in the range of about 25 Hz to about 1000 Hz is generally suitable, and a frequency in the range of about 65 Hz to about 450 Hz is presently preferred for the output signal 16 from the low frequency oscillator 13.

In the presently preferred embodiment, the output 14 of the high frequency oscillator 12 has a constant frequency, as does the output 16 of the low frequency oscillator 13. However, the invention is also applicable to situations in which the frequency of the output of one or both of the oscillators 12, 13 can be varied.

Figure 3:
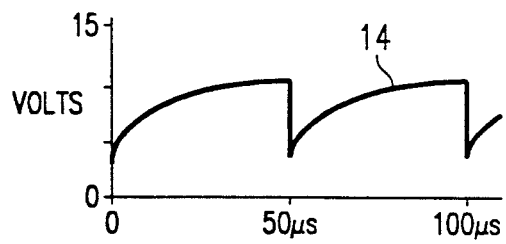
FIG. 3 is a graph illustrating the waveform of the output of the high frequency oscillator of FIG. 2.
Figure 5:
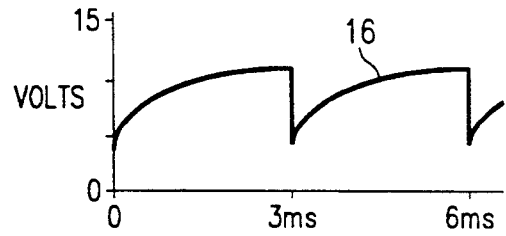
FIG. 5 is a graph illustrating the waveform of the output of the low frequency oscillator of FIG. 2.

FIG. 3 illustrates the waveform of the output signal 14 from high frequency oscillator 12 where the system regulated voltage is 15 volts DC, the frequency is 20 kHz, the minimum amplitude is about 5 volts DC, and the maximum amplitude is about 10 volts DC. Similarly, FIG. 5 illustrates the waveform of the output signal 16 from low frequency oscillator 13 where the system regulated voltage is 15 volts DC, the frequency is 330 Hz, the minimum amplitude is about 5 volts DC, and the maximum amplitude is about 10 volts DC.

Figure 4:
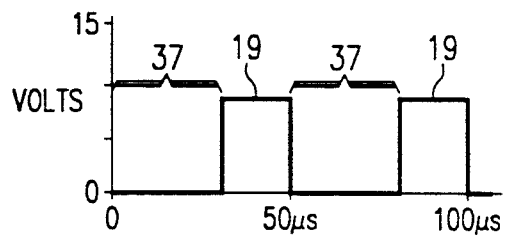
FIG. 4 is a graph illustrating the waveform of the output of the high frequency pulse generator of FIG. 2.

The output signal 14 from the high frequency oscillator 12 is applied to an input of high frequency pulse generator 17. As shown in FIG. 4, the output signal 18 from the high frequency pulse generator 17 is a series of "on" pulses 19, with one "on" pulse per cycle, each cycle of output signal 18 corresponding to one cycle of the output signal 14 from the high frequency oscillator 12. The pulsewidth of each "on" pulse 19 is determined by a comparison of the waveform of high frequency oscillator output signal 14 with a reference voltage which is inputted to the high frequency pulse generator 17, with an "on" pulse 19 occurring when the output signal 14 exceeds the reference voltage.

Figure 6:
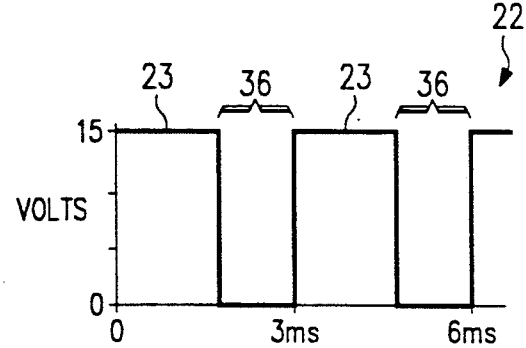
FIG. 6 is a graph illustrating the waveform of the output of the low frequency pulse generator of FIG. 2.

The output signal 16 from the low frequency oscillator 13 is applied to an input of low frequency pulse generator 21. As shown in FIG. 6, the output signal 22 from the low frequency pulse generator 21 is a series of "on" pulses 23, with one "on" pulse 23 per cycle, each cycle of output signal 22 corresponding to one cycle of the output signal 16 from the low frequency oscillator 13. The pulsewidth of each "on" pulse 23 is determined by a comparison of the waveform of low frequency oscillator output signal 16 with a setpoint voltage represented by the input 24 to the low frequency pulse generator 21, with an "on" pulse 23 occurring when the output signal 16 is less than the setpoint voltage 24.

Figure 7:
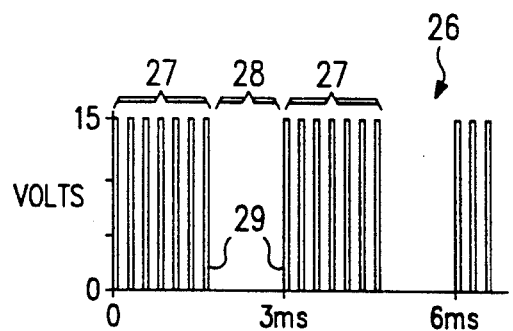
FIG. 7 is a graph illustrating the waveform of the output of the frequency modulator of FIG. 2.

The output signal 18 from the high frequency pulse generator 17 is applied to a first input of frequency modulator 25, while the output signal 22 from the low frequency pulse generator 21 is applied to a second input of frequency modulator 25. The high frequency output signal 18 is used as the fundamental pulsing rate, and the low frequency output signal 22 is superimposed on the high frequency waveform 18 by the frequency modulator 25 to produce a frequency modulated output signal 26 (FIG. 7). The frequency modulated output signal 26 is a cyclic signal with each cycle thereof having a first cycle portion 27 and a second cycle portion 28. One of the first and second cycle portions contains a plurality of high frequency pulses 29 while the other cycle portion is at least substantially free of high frequency pulses and is preferably "off", e.g. at zero volts. For purposes of clarity in the drawings, the number of high frequency pulses 29 illustrated within a cycle portion 27 in FIG. 7 is less than the actual number of such high frequency pulses which would result from the waveform of FIG. 4.

For the frequency modulated output signal 26 represented in FIG. 7, the length of the first cycle portion 27, which contains the high frequency pulses 29, corresponds to the length of an "on" pulse 23 in the output signal 22 (FIG. 6) from the low frequency pulse generator 21, while the length of the second cycle portion 28 corresponds to the length of the "off" portion 36 of a cycle in the output signal 22 (FIG. 6). Thus, the length of a cycle in output signal 26 (i.e. cycle portion 27 plus cycle portion 28 in FIG. 7) corresponds to the length of a cycle in the output signal 16 from the low frequency oscillator 13. The frequency of the pulses 29 during the first cycle portion 27 corresponds to the frequency of the output signal 14 from the high frequency oscillator 12, with the length of each high frequency "on" pulse 29 corresponding to the length of an "on" pulse 19 in the output signal 18 from the high frequency pulse generator 17.

Figure 8:
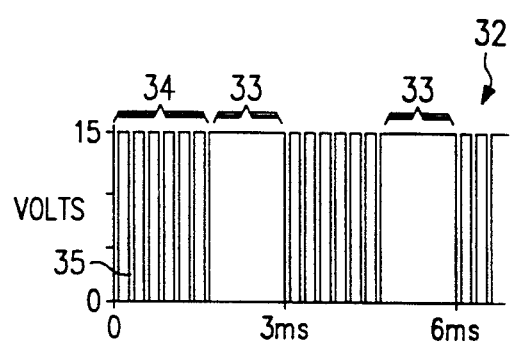
FIG. 8 is a graph illustrating the waveform of the output of the FET driver of FIG. 2.

The output signal 26 from the frequency modulator 25 is applied to an input of the field effect transistor (FET) driver circuit 31. The FET driver circuit 31 inverts the signal 26 to produce a drive signal 32. As shown in FIG. 8, the drive signal 32 comprises a plurality of cycles with the length (time duration) of each cycle thereof corresponding to the length of a cycle in the low frequency output signal 16 (FIG. 5). Each cycle of drive signal 32 has a first cycle portion and a second cycle portion, with one cycle portion 33 being "on" throughout its extent, and the other cycle portion 34 comprising a plurality of high frequency "on" pulses 35 separated by "off" segments. The length (time duration) of the fully "on" cycle portion 33 corresponds to the length of the "off" cycle portion 28 (FIG. 7) of the output signal 26 from the frequency modulator 25 and thus to the "off" cycle portion 36 (FIG. 6) of the output signal 22 from the low frequency pulse generator 21. Similarly, the length of the cycle portion 34, containing high frequency pulses 35, corresponds to the length of the "on" cycle portion 23 (FIG. 6) of the output signal 22 from the low frequency pulse generator 21.

The length of each high frequency "on" pulse 35 in cycle portion 34 (FIG. 8) corresponds to the "off" portion of a high frequency cycle of pulses 29 (FIG. 7) and thus to the "off" cycle portion 37 (FIG. 4) in the output signal 18 from the high frequency pulse generator 17. Similarly, the length of each "off" segment in the cycle portion 34 corresponds to the length of an "on" pulse 29 and thus to the "on" cycle portion 19 (FIG. 4) in the output signal 18 from the high frequency pulse generator 17.

The output signal 32 from the FET driver circuit 31 is applied to an input of power FET circuit 41. The power field effect transistor FET circuit 41 is connected in series with DC motor 15 and power switch 42 across the terminals of DC power source 43. A freewheeling diode circuit 44 is connected in parallel with motor 15 to minimize inverse voltage spikes. An input of the voltage regulator 45 is connected through power switch 42 to one terminal of DC power source 43, with the output of voltage regulator 45 being the system regulated voltage $V_R$.

Figure 9:
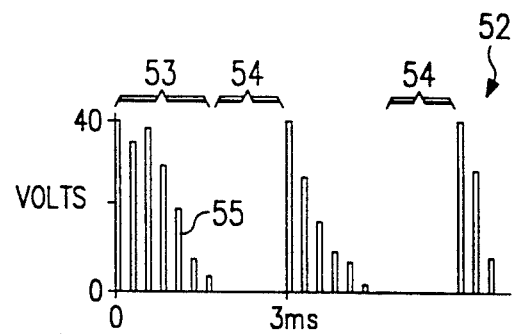
FIG. 9 is a graph illustrating the waveform of the output of the power FET of FIG. 2 at approximately 50% power under freewheeling conditions.
Figure 10:
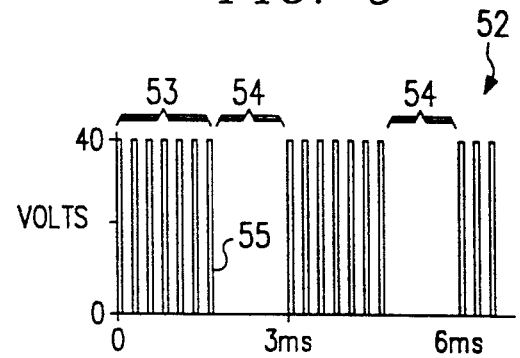
FIG. 10 is a graph illustrating the waveform of the output of the power FET of FIG. 2 at approximately 50% power under stalling conditions.

The waveform of the output 52 of the power FET circuit 41 is illustrated in FIG. 9 at approximately 50% power under freewheeling conditions, and in FIG. 10 at approximately 50% power under stalling conditions. In each instance, the output 52 comprises a plurality of cycles with the length of each cycle thereof corresponding to the length of a cycle in the low frequency output signal 16 (FIG. 5). Each cycle in the waveform of the output 52 comprises a first cycle portion 53 and a second cycle portion 54, with the first cycle portion 53 containing a plurality of high frequency pulses 55 and the second cycle portion 54 representing a "shorting" condition of the power FET, i.e. being at least substantially zero volts throughout its extent.

The length of the "shorting" cycle portion 54 corresponds to the length of the fully "on" cycle portion 33 (FIG. 8) of the output signal 32 from the FET driver circuit 41 and thus to the "off" cycle portion 36 (FIG. 6) of the output signal 22 from the low frequency pulse generator 21. Similarly, the length of the cycle portion 53, containing high frequency pulses 55, corresponds to the length of the "on" cycle portion 23 (FIG. 6) of the output signal 22 from the low frequency pulse generator 21.

The length of each high frequency pulse 55 in cycle portion 53 (FIGS. 9 and 10) corresponds to the time duration or length of the "off" portion of a high frequency cycle of pulses 35 (FIG. 8) and thus to the "on" pulse 29 (FIG. 7) and the "on" pulse 19 (FIG. 4) in the output signal 18 from the high frequency pulse generator 17. Similarly, the length of each "off" segment in the cycle portion 53 corresponds to the length of an "on" pulse 35 (FIG. 8) and thus to the "off" portion between pulses 29 (FIG. 7) and to the "off" cycle portion 37 (FIG. 4) in the output signal 18 from the high frequency pulse generator 17. The operation of the power FET circuit 41 is such that the maximum power flows from the DC source 43 to the windings of DC motor 15 when the output of power FET circuit 41 is zero volts.

The system voltage $V_R$ is applied to an input of pulse-width limiting circuit 46 to provide a predetermined voltage as a control signal 47 to an external power setpoint circuit 48. An external lever 49 is manually actuated by the operator or is automatically actuated by a suitable control mechanism to indicate the speed desired for the motor 15. Power setpoint circuit 48 produces a voltage signal 51 which is representative of the desired motor speed and the output of power setpoint circuit 48 is connected to setpoint input 24 of low frequency pulse generator 21 to vary the pulse width of the "on" pulses in the output signal 22 from low frequency pulse generator 21 in accordance with the desired speed for motor 15 as represented by setpoint voltage signal 51. Optionally, the voltage signal 51 can also be applied to input 20 of the high frequency pulse generator 17 to vary the pulse width of the "on" pulses in the output signal 18 from the high frequency pulse generator 17 in accordance with the desired speed for motor 15.

The duty cycle for the high frequency cycle, i.e. the ratio of the length of an "on" pulse 19 to the length of a cycle of output signal 18, can be any suitable value, but will generally be in the range of about 10% to about 80%, and preferably will be in the range of about 15% to about 60%. In an embodiment wherein the "on" pulses 19 represent 35% of a cycle in the output signal 18 from high frequency pulse generator 17, each of the high frequency "on" pulses 29 (FIG. 7) would also represent 35% of each high frequency cycle, while the "on" pulses 35 (FIG. 8) would represent 65% of each high frequency cycle within the overall cycle portion 34. This would result in each high frequency pulse 55 representing 35% of each high frequency cycle while the "zero" space between adjacent high frequency pulses 55 in cycle portion 53 would represent 65% of each high frequency cycle.

The duty cycle of the output signal 22 from the low frequency pulse generator 21, i.e. the ratio of the length of an "on" pulse 23 to the length of a cycle of output signal 22, is varied according to the desired speed. The range of this variation can be any suitable range, but will generally be from about 2 to about 100% and preferably will be from about 5 to about 100%. The length of the low frequency pulses 23 should not be reduced to zero as this would result in a detrimental continuous "shorting" of the power FET devices in power FET circuit 41.

For a desired speed input represented by a low frequency duty cycle of 60%, the "on" pulse 23 would constitute 60% of the low frequency cycle and the "off" segment 36 would constitute 40% of the low frequency cycle in the output signal 22. Thus, the length of the fully "on" pulse 33 (FIG. 8) would represent 40% of a cycle in the output signal 32 (FIG. 8), while the cycle portion 34, containing the high frequency pulses 35, would represent 60% of the cycle in the output signal 32. It follows that the length of the "shorted" cycle portion 54 in the output 52 of power FET circuit 41 (FIGS. 9 and 10) would represent 40% of a cycle in the output signal 52, while the cycle portion 53, containing the high frequency pulses 55, would represent 60% of the cycle in the output 52 (FIGS. 9 and 10) of the power FET circuit 41. With a 35% high frequency duty cycle for the output signal 18 from the high frequency pulse generator 17, the power FET circuit would be "shorted" for 79% of the cycle of its output 52 (40% represented by cycle portion 54, plus 65% of the 60% represented by cycle portion 53), and thus maximum power would be applied to motor 15 for 79% of the cycle of the output of the low frequency oscillator 13.

Where high frequency pulses 19 are maintained constant at 35% of the high frequency cycle, and the low frequency pulses 23 range from 5 to 100% of the low frequency cycle, power is applied to the motor 15 in the range of 65% to 98.25% of the length of the low frequency cycle. Where high frequency pulses 19 are maintained constant at 50% of the high frequency cycle, and the low frequency pulses 23 range from 5 to 100% of the low frequency cycle, power is applied to the motor 15 in the range of 50% to 97.5% of the length of the low frequency cycle.

Referring now to the specific embodiment of FIG. 2, the high frequency pulse generator 17 is a solid state comparator 61 having an isolating resistor 62 connected between the output of high frequency oscillator 12 and the non-inverting input terminal of the comparator 61. A voltage divider is formed by resistors 63 and 64 connected in series between the system regulated voltage $V_R$ and the chassis ground, with a capacitor 65 being connected in parallel with resistor 64. The junction between resistors 63 and 64 is connected to the inverting input terminal of comparator 61 in order to apply the reference voltage to the inverting input terminal of comparator 61. An "on" pulse 19 (FIG. 4) is produced when the output signal 14 exceeds the reference voltage at the inverting input of comparator 61. In one embodiment the reference voltage is a constant voltage provided by the voltage divider composed of resistors 63 and 64. In another embodiment, the reference voltage is the voltage at the inverting input terminal of comparator 61 resulting from a combination of the voltage divider and the input 20 which is provided by the output 51 of power setpoint circuit 48. Resistor 64 and capacitor 65 constitute a long time constant filter connected to the inverting input of comparator 61, to prevent rapid pulsewidth changes in the output signal 18 produced by comparator 61 which would otherwise occur due to excessively rapid variations in the output 51 from power setpoint circuit 48.

The output pulse of the comparator 61 is shifted to a desired voltage level by being connected to the junction between voltage divider resistors 66 and 67, with the other end of resistor 66 being connected to the system regulated voltage $V_R$, and the other end of resistor 67 being connected to chassis ground. The output of comparator 61 is also connected to the inverting input of a comparator 68 in frequency modulator 25.

The low frequency pulse generator 21 is a solid state comparator 71 that accepts the low frequency sawtooth waveform 16 through an isolating resistor 72 connected between the output of low frequency oscillator 13 and the inverting input terminal of the comparator 71. A setpoint voltage, provided as the output 51 of the external power setpoint circuit 48, is applied to the non-inverting input terminal of comparator 71. A resistor 74 and a capacitor 75, connected in parallel with each other between the non-inverting input terminal of comparator 71 and the chassis ground, constitute a long time constant filter for filtering the setpoint voltage to prevent rapid pulse-width changes.

The pulse width limiter 46 comprises a variable resistor 77 connected between the system regulated voltage $V_R$ and an input of power setpoint circuit 48, and applies a controlled voltage to the power setpoint circuit 48 so that the output of the power setpoint circuit 48 is representative of the desired speed indicated by the position of control lever 49. Thus, the controlled voltage constitutes a limit on the maximum voltage output of power setpoint circuit 48, thereby controlling the minimum pulsewidth of the "on" pulses 23 in the output signal 22 of comparator 71.

The output signal 22 of comparator 71 is referenced to the desired voltage level by a pull-up resistor 78 connected between the output of comparator 71 and the system regulated voltage $V_R$. The output signal 22 is applied to the non-inverting input terminal of comparator 68 in the frequency modulator 25.

The frequency modulator 25 comprises two solid state comparator circuits 68 and 81, with the output of comparator 68 being connected to the inverting input of comparator 81 and through resistor 82 to the system regulated voltage $V_R$. The non-inverting input terminal of comparator circuit 81 is connected to the junction of voltage divider resistors 83 and 84, with the other end of resistor 83 being connected to the system regulated voltage $V_R$, and the other end of resistor 84 being connected to the chassis ground. The comparator 68 accepts output signal 18 from high frequency pulse generator 17 and output signal 22 from the low frequency pulse generator 21, with the voltage levels of these two output signals 18 and 22 being such that the output of comparator 68 is the high frequency waveform 18 modulated with the low frequency waveform 22. The output signal from comparator 68 is referenced to the desired voltage level by pull-up resistor 82 and serves as the input signal to comparator 81. Comparator 81, which functions as an isolating circuit, inverts the output signal from comparator 68 and produces output signal 26 (FIG. 7), which is referenced to the system regulated voltage $V_R$ by pull-up resistor 85.

The output signal 26 from frequency modulator 25 is applied to an input of the driver 86 of FET driver circuit 31. Driver 86 is an IC driver with an inverted output. The drive pulse output signal 32 (FIG. 8) from driver 86 is applied through current limiting resistor 87 to the gate of power FET 88 of power FET circuit 41. The source terminal of FET 88 is connected to the chassis ground, while the drain terminal of FET 88 is connected directly to DC motor 15. When the FET 88 is ON, a circuit for the passage of electrical current from the DC power source circuit 43 to the motor 15 is completed through FET 88 to the chassis ground. When the FET 88 is OFF, the power source circuit to the motor 15 is broken. A freewheeling diode 91 is connected between the terminals of motor 15 in a reverse polarity fashion.

The voltage regulator circuit 45 comprises an IC series voltage regulator 92 having its input connected through input diode 93 to the positive terminal of DC power source circuit 43 and through filtering capacitor 94 to chassis ground. The output of voltage regulator 92 is the system regulated voltage $V_R$.

Although the FET switching time is very fast, e.g. 15 ns to 20 ns, each cycle in the output of the power FET circuit 41 forces the FETs to transition from a very high resistance, e.g. >10,000,000 ohms, to a low resistance state, e.g. <0.028 ohm. It is during this transition that most of the heat produced by the FET device is generated. However, with the use of the low frequency modulation in accordance with the present invention, the total number of power FET "on"/"off" cycles is reduced, thereby reducing the heat production. More importantly, the control circuit of the present invention conserves battery power in that the current supplied from the battery to the control circuit and the motor is directly related to the desired motor speed.

Reasonable variations and modifications are possible within the scope of the foregoing description, the drawings and the appended claims to the invention. For example, the duty cycle of the high frequency pulses 19 from the high frequency pulse generator 17 can be varied in response to the output 51 of power setpoint circuit 48 to the same degree as, or to a different degree from, the variation in the duty cycle of the low frequency pulses 23 from the low frequency pulse generator 21. The power FET circuit 41 can include a plurality of power FET devices. The low frequency pulse generator 21 could produce a different frequency for each of several different speed ranges.

I claim:

1. A control system for controlling the flow of power from a DC power source to a DC motor in order to control the speed of said motor, said control system comprising:
   a frequency modulator having first and second inputs and an output;
   a first pulse generator for generating first pulses at a first frequency and a first duty cycle and for applying said first pulses to said first input of said frequency modulator;
   a second pulse generator for generating second pulses at a second frequency and a second duty cycle and for applying said second pulses to said second input of said frequency modulator, wherein said first frequency is substantially lower than said second frequency, so that said frequency modulator produces a frequency modulated output signal at the output of said frequency modulator by superimposing said first pulses on said second pulses;
   a power circuit for applying power to said motor in response to the frequency modulated output signal of said frequency modulator; and
   a control circuit for varying the duty cycle of said first pulses in response to a signal representing the desired speed of said motor.

2. A control system for controlling the flow of power from a DC power source to a DC motor in order to control the speed of said motor, said control system comprising:
   a frequency modulator having first and second inputs and an output;
   a first pulse generator for generating first pulses at a first frequency and a first duty cycle and for applying said first pulses to said first input of said frequency modulator;
   a second pulse generator for generating second pulses at a second frequency and a second duty cycle and for applying said second pulses to said second input of said frequency modulator, wherein said first frequency is substantially lower than said second frequency;
   a power circuit for applying power to said motor in response to the output of said frequency modulator; and
   a control circuit for varying the duty cycle of said first pulses in response to a signal representing the desired speed of said motor;
   wherein said control circuit comprises a manually positionable lever for indicating a desired speed of said motor, a power setpoint circuit for producing a voltage signal representative of the thus indicated desired speed, and a connection for applying said voltage signal to an input of said first pulse generator to modify the duty cycle of said first pulses in response to said voltage signal.

3. A control system in accordance with claim 2, wherein said first pulse generator comprises a low frequency oscillator, and a first comparator having first and second inputs, wherein said connection is to said first input of said first comparator, and wherein the output of said low frequency oscillator is applied to said second input of said first comparator.

4. A control system in accordance with claim 3, wherein said first pulse generator further comprises a filter circuit connected to said first input of said first comparator in order to prevent rapid pulse-width changes in the output signal produced by said first pulse generator.

5. A control system in accordance with claim 4, wherein said second pulse generator comprises a high frequency oscillator, and a second comparator having first and second inputs, wherein a reference voltage is applied to said first input of said second comparator, and wherein the output of said high frequency oscillator is applied to said second input of said second comparator.

6. A control system in accordance with claim 5, wherein said second pulse generator further comprises a filter circuit connected to said first input of said second comparator in order to prevent rapid pulse-width changes in the output signal produced by said second pulse generator.

7. A control system in accordance with claim 6, further comprising a connection for applying said voltage signal to said first input of said second comparator to modify the duty cycle of said second pulses in response to said voltage signal.

8. A control system in accordance with claim 7, wherein said reference voltage is provided by a voltage divider connected between a system regulated voltage and a common ground.

9. A control system in accordance with claim 8, wherein said frequency modulator comprises a third comparator having first and second inputs and an output, a fourth comparator having first and second inputs and an output, wherein the output of said first pulse generator is connected to the first input of said third comparator and the output of said second pulse generator is connected to the second input of said third comparator, wherein the output of said third comparator is connected to the first input of said fourth comparator, and wherein a reference voltage is applied to the second input of said fourth comparator.

10. A control system in accordance with claim 9, wherein said high frequency oscillator and said low frequency oscillator constitute a dual frequency oscillator which produces two independent output signals having constant but different frequencies.

11. A control system in accordance with claim 10, wherein said power circuit comprises at least one power field effect transistor connected in series with said motor and said power source, and a driver circuit for actuating said at least one power field effect transistor in response to the output of said frequency modulator to thereby control the flow of current from said power source to said motor in response to said signal representing the desired speed of said motor.

12. A control system in accordance with claim 11, further comprising at least one diode connected in parallel with said motor 13. A control system in accordance with claim 1, wherein said first pulse generator comprises a low frequency oscillator, and a first comparator having first and second inputs, wherein said control circuit applies to said first input of said first comparator a voltage signal representing the desired speed of said motor, and wherein the output of said low frequency oscillator is applied to said second input of said first comparator.

14. A control system in accordance with claim 1, wherein said first pulse generator further comprises a filter circuit to prevent rapid pulse-width changes in the output signal produced by said first pulse generator.

15. A control system in accordance with claim 1, wherein said power circuit comprises at least one power field effect transistor connected in series with said motor and said power source, and a drive circuit for actuating said at least one power field effect transistor in response to the frequency modulated output signal of said frequency modulator to thereby control the flow of current from said power source to said motor in response to said signal representing the desired speed of said motor.

16. A control system in accordance with claim 1, further comprising at least one diode connected in parallel with said motor.

17. A control system in accordance with claim 1, wherein said control circuit also varies the duty cycle of said second pulses in response to a signal representing the desired speed of said motor.

18. A control system in accordance with claim 1, wherein said first pulse generator further comprises a filter circuit to prevent rapid pulse-width changes in the output signal produced by said first pulse generator, and wherein said second pulse generator further comprises a filter circuit to prevent rapid pulse-width changes in the output signal produced by said second pulse generator.

19. A control system in accordance with claim 1, wherein said frequency modulator comprises a first comparator having first and second inputs and an output, a second comparator having first and second inputs and an output, wherein the output of said first pulse generator is connected to the first input of said first comparator and the output of said second pulse generator is connected to the second input of said first comparator, wherein the output of said first comparator is connected to the first input of said second comparator, and wherein a reference voltage is applied to the second input of s id second comparator.

20. A control system for controlling the flow of power from a battery to a DC motor in order to control the speed of said motor, said control system comprising:
  a frequency modulator having first and second inputs and an output;
  a low frequency pulse generator for generating a low frequency pulsed output signal and for applying said low frequency pulsed output signal to said first input of said frequency modulator;
  a high frequency pulse generator for generating a high frequency pulsed output signal and for applying said high frequency pulsed output signal to said second input of said frequency modulator, so that said frequency modulator produces a frequency modulated output signal at the output of said frequency modulator by superimposing said low frequency pulsed output signal on said high frequency pulsed output signal;
  a power circuit for applying power from said battery to said motor in response to the frequency modulated output signal of said frequency modulator; and
  a control circuit for varying the on-off ratio of the pulses of said low frequency output signal in response to a signal representing the desired speed of said motor.

21. A control system for controlling the flow of power from a battery to a DC motor in order to control the speed of said motor, said control system comprising:
  a frequency modulator having first and second inputs and an output signal;
  a low frequency pulse generator for generating a low frequency pulsed output signal and for applying said low frequency pulsed output signal to said first input of said frequency modulator;
  a high frequency pulse generator for generating a high frequency pulsed output signal and for applying said high frequency pulsed output signal to said second input of said frequency modulator;
  a power circuit for applying power from said battery to said motor in response to the output signal of said frequency modulator; and
  a control circuit for varying the on-off ratio of the pulses of said low frequency pulsed output signal in response to a signal representing the desired speed of said motor;
  wherein the length of each cycle of the output signal from said frequency modulator corresponds to the length of a cycle in the low frequency pulsed output signal, with each cycle of the output signal from said frequency modulator having an "off" cycle portion and an "on" cycle portion, with the "on" cycle portion of said output signal from said frequency modulator comprising a plurality of pulses having a frequency corresponding to the frequency of said high frequency pulsed output signal.

22. A control system in accordance with claim 21, wherein said power circuit comprises at least one power field effect transistor connected in series with said motor and said battery, and a drive circuit for actuating said at least one power field effect transistor in response to the output signal of said frequency modulator to thereby control the flow of current from said battery to said motor in response to said signal representing the desired speed of said motor.

23. A control system in accordance with claim 22, further comprising at least one freewheeling diode connected in parallel with said motor.

24. A control system in accordance with claim 23, wherein said control circuit comprises a manually positionable lever for indicating a desired speed of said motor, a power setpoint circuit for producing a voltage signal representative of the thus indicated desired speed, and a connection for applying said voltage signal to an input of said first pulse generator to modify the on-off ratio of the pulses of said low frequency pulsed output signal in response to a signal representing the desired speed of said motor.

25. A control system in accordance with claim 24, wherein said first pulse generator comprises a low frequency oscillator, and a first comparator having first and second inputs, wherein said connection is to said first input of said first comparator, and wherein the output of said low frequency oscillator is applied to said second input of said first comparator.

26. A process for controlling the flow of power from a DC power source to a DC motor in order to control the speed of said motor, said process comprising the steps of:
  generating first pulses at a first frequency and a first duty cycle;
  generating second pulses at a second frequency and a second duty cycle, wherein said first frequency is substantially lower than said second frequency;
  generating, responsive to said first pulses and said second pulses, a frequency modulated signal by superimposing said first pulses on said second pulses;
  applying power to said motor in response to said frequency modulated signal; and varying the duty cycle of said first pulses in response to a signal representing the desired speed of said motor.

27. A process in accordance with claim 26 further comprising the step of varying the duty cycle of said second pulses in response to a signal representing the desired speed of said motor.

28. A process in accordance with claim 26 wherein said first pulses have a constant frequency in the range of about 25 HZ to about 1000 Hz, and wherein said second pulses have a constant frequency in the range of about 5 kHz to about 100 kHz.

29. A process in accordance with claim 28 wherein said first duty cycle is in the range of about 2 to about 100%, and wherein said second duty cycle is in the range of about 10 to about 80%.

30. A process in accordance with claim 28 wherein said first duty cycle is in the range of about 5 to about 100%, and wherein said second duty cycle is in the range of about 15 to about 60%.

31. A process in accordance with claim 26 wherein said first duty cycle is in the range of about 2 to about 100%, and wherein said second duty cycle is in the range of about 10 to about 80%.

32. A process in accordance with claim 26 wherein said first duty cycle is in the range of about 5 to about 100%, and wherein said second duty cycle is in the range of about 15 to about 60%.

33. A process in accordance with claim 26 wherein said first pulses have a constant frequency, and wherein said second pulses have a constant frequency.

* * * * *

UNITED STATES PATENT AND TRADEMARK OFFICE
CERTIFICATE OF CORRECTION

PATENT NO. : 5,289,560
DATED : February 22, 1994
INVENTOR(S) : Harold W. Abney

It is certified that error appears in the above-indentified patent and that said Letters Patent is hereby corrected as shown below:

```
Column 10, line 68, delete "drive" and insert --driver--.
Column 11, line 32, delete "s id" and insert --said--.
Column 11, line 56, after "frequency", insert --pulsed--.
Column 12, line 26, delete "drive" and insert --driver--.
```

Signed and Sealed this

Twelfth Day of July, 1994

Attest:

BRUCE LEHMAN

Attesting Officer  Commissioner of Patents and Trademarks